US012666389B2

(12) United States Patent
Henry et al.

(10) Patent No.: US 12,666,389 B2
(45) Date of Patent: Jun. 23, 2026

(54) AP LOCALIZATION BASED ON CLIENT ANCHORING

(71) Applicant: Cisco Technology, Inc., San Jose, CA (US)

(72) Inventors: Jerome Henry, Pittsboro, NC (US); Peiman Amini, Fremont, CA (US); Ardalan Alizadeh, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 18/465,594

(22) Filed: Sep. 12, 2023

(65) Prior Publication Data

US 2025/0089013 A1 Mar. 13, 2025

(51) Int. Cl.
*H04W 64/00* (2009.01)
*H04W 24/10* (2009.01)

(52) U.S. Cl.
CPC ......... *H04W 64/003* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2013/0237246 A1 | 9/2013 | Aggarwal et al. | |
| 2021/0227489 A1* | 7/2021 | Henry | G01S 5/0289 |
| 2021/0282108 A1 | 9/2021 | Smith et al. | |

| | | | |
|---|---|---|---|
| 2021/0306975 A1* | 9/2021 | Raghu | H04W 40/248 |
| 2022/0390614 A1 | 12/2022 | Ganu et al. | |
| 2023/0136500 A1 | 5/2023 | Perahia et al. | |

(Continued)

FOREIGN PATENT DOCUMENTS

| | | |
|---|---|---|
| WO | 2018080597 A1 | 5/2018 |
| WO | 2021046714 A1 | 3/2021 |

OTHER PUBLICATIONS

Henry J., et al., "Sensor Self-location with FTM Measurements", 2020 16th International Conference on Wireless and Mobile Computing, Networking and Communications (WIMOB) (50308), IEEE, Oct. 12, 2020, 6 Pages, XP033857931, DOI: 10.1109/WIMOB50308. 2020.9253395, The Whole Document.

(Continued)

*Primary Examiner* — Adolf Dsouza
(74) *Attorney, Agent, or Firm* — Rutan & Tucker, LLP; Ravi Mohan; Marc McClain

(57) ABSTRACT

Described herein are devices, systems, methods, and processes for improving the accuracy of access point (AP) location in a Wi-Fi network using client device data and AP ranging measurements. APs may be deployed across a specific area. The APs can range to one another and form a matrix of measurements. Techniques such as semidefinite programming or multidimensional scaling (MDS) can be employed to transform these AP-to-AP ranges into a set of coordinates. Client devices in the area may also range to the APs. The client devices may provide their location measurement report (LMR) feedback and geo-position estimation to the network. The client devices-provided data, along with the AP-to-AP matrices, may be returned to a location server. The location server can use the data to refine the accuracy of the AP-to-AP graph and ascertain the most probable geo-position of the APs.

19 Claims, 10 Drawing Sheets

(56) References Cited

U.S. PATENT DOCUMENTS

2023/0176164 A1\* 6/2023 Ganu .................... G01S 5/0205
                                                     455/456.1
2023/0292134 A1\* 9/2023 Ganu ................. H04W 64/003

OTHER PUBLICATIONS

International Search Report and Written Opinion for International Application No. PCT/US2024/046231, mailed Mar. 3, 2025, 25 Pages.

\* cited by examiner

600

RECEIVE AP-TO-AP RANGING DATA
ASSOCIATED WITH A PLURALITY OF APS ~ 610

RECEIVE CLIENT DEVICE-TO-AP RANGING DATA
ASSOCIATED WITH AT LEAST ONE CLIENT DEVICE
AND AT LEAST SOME APS IN THE PLURALITY OF APS ~ 620

RECEIVE AT LEAST ONE GEO-POSITION ESTIMATION
ASSOCIATED WITH THE AT LEAST ONE CLIENT DEVICE ~ 630

ESTIMATE A RESPECTIVE GEO-POSITION
FOR EACH AP IN THE PLURALITY OF APS ~ 640

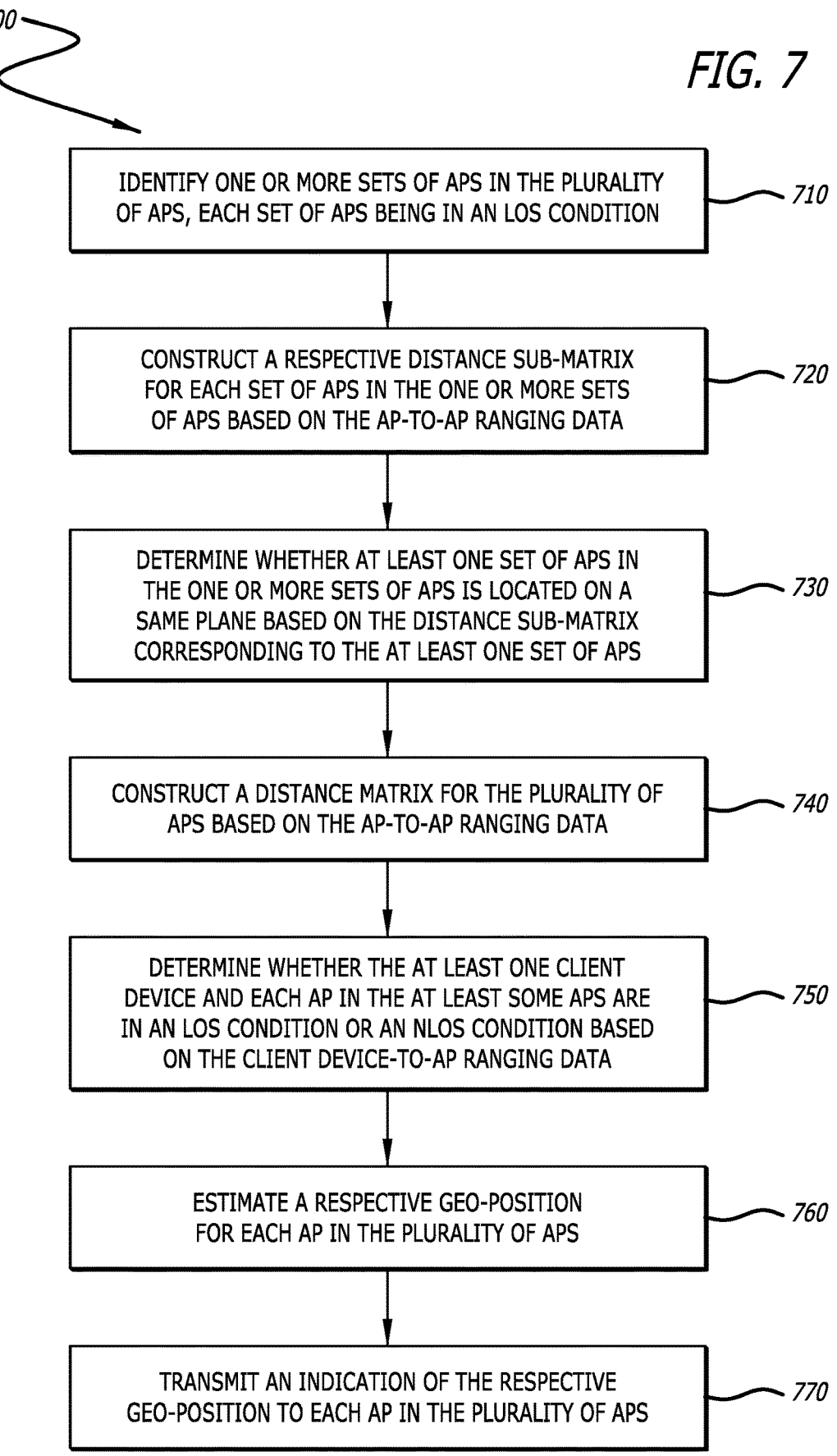

IDENTIFY ONE OR MORE SETS OF APS IN THE PLURALITY OF APS, EACH SET OF APS BEING IN AN LOS CONDITION — 710

CONSTRUCT A RESPECTIVE DISTANCE SUB-MATRIX FOR EACH SET OF APS IN THE ONE OR MORE SETS OF APS BASED ON THE AP-TO-AP RANGING DATA — 720

DETERMINE WHETHER AT LEAST ONE SET OF APS IN THE ONE OR MORE SETS OF APS IS LOCATED ON A SAME PLANE BASED ON THE DISTANCE SUB-MATRIX CORRESPONDING TO THE AT LEAST ONE SET OF APS — 730

CONSTRUCT A DISTANCE MATRIX FOR THE PLURALITY OF APS BASED ON THE AP-TO-AP RANGING DATA — 740

DETERMINE WHETHER THE AT LEAST ONE CLIENT DEVICE AND EACH AP IN THE AT LEAST SOME APS ARE IN AN LOS CONDITION OR AN NLOS CONDITION BASED ON THE CLIENT DEVICE-TO-AP RANGING DATA — 750

ESTIMATE A RESPECTIVE GEO-POSITION FOR EACH AP IN THE PLURALITY OF APS — 760

TRANSMIT AN INDICATION OF THE RESPECTIVE GEO-POSITION TO EACH AP IN THE PLURALITY OF APS — 770

FIG. 8

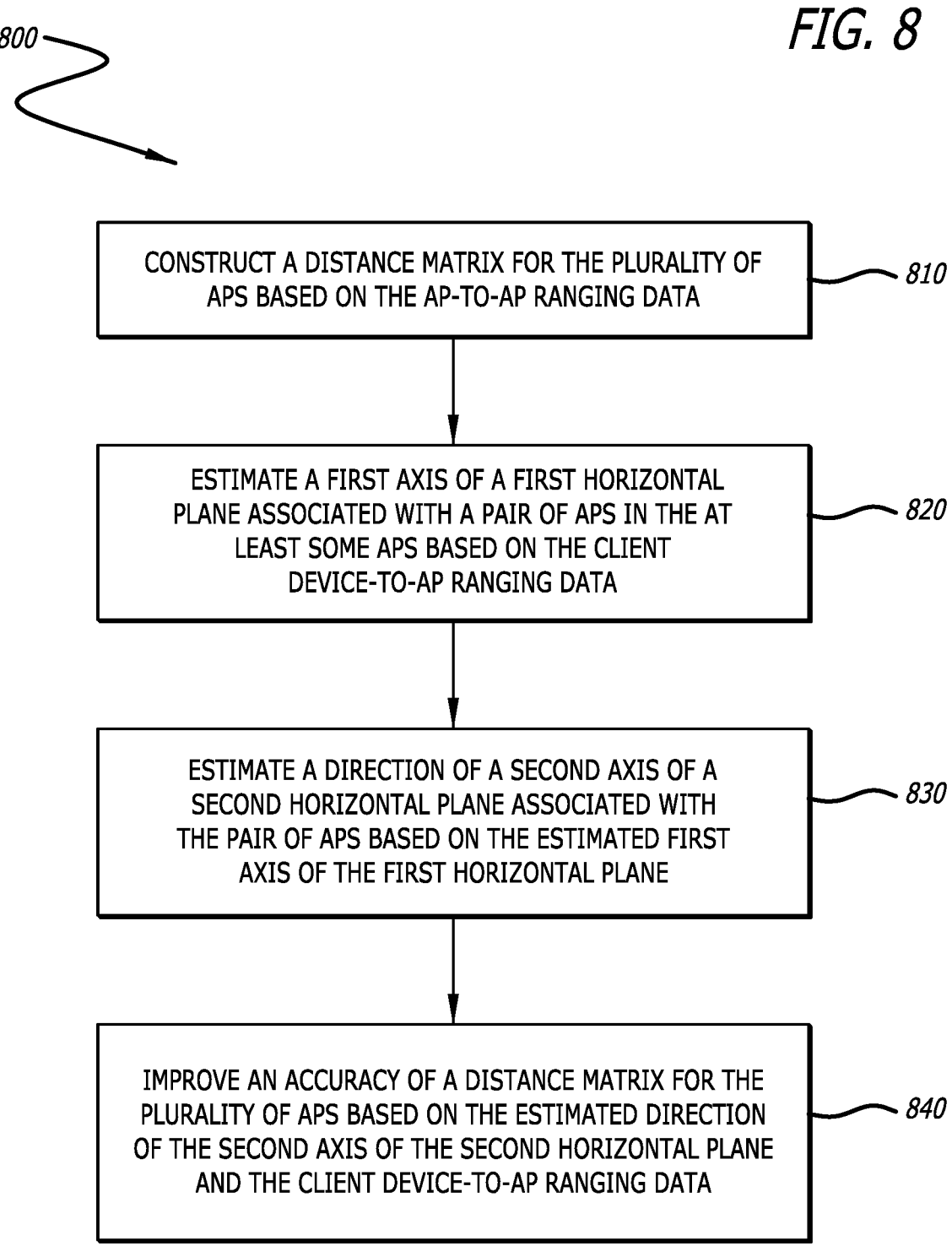

800

CONSTRUCT A DISTANCE MATRIX FOR THE PLURALITY OF APS BASED ON THE AP-TO-AP RANGING DATA — 810

ESTIMATE A FIRST AXIS OF A FIRST HORIZONTAL PLANE ASSOCIATED WITH A PAIR OF APS IN THE AT LEAST SOME APS BASED ON THE CLIENT DEVICE-TO-AP RANGING DATA — 820

ESTIMATE A DIRECTION OF A SECOND AXIS OF A SECOND HORIZONTAL PLANE ASSOCIATED WITH THE PAIR OF APS BASED ON THE ESTIMATED FIRST AXIS OF THE FIRST HORIZONTAL PLANE — 830

IMPROVE AN ACCURACY OF A DISTANCE MATRIX FOR THE PLURALITY OF APS BASED ON THE ESTIMATED DIRECTION OF THE SECOND AXIS OF THE SECOND HORIZONTAL PLANE AND THE CLIENT DEVICE-TO-AP RANGING DATA — 840

*FIG. 9*

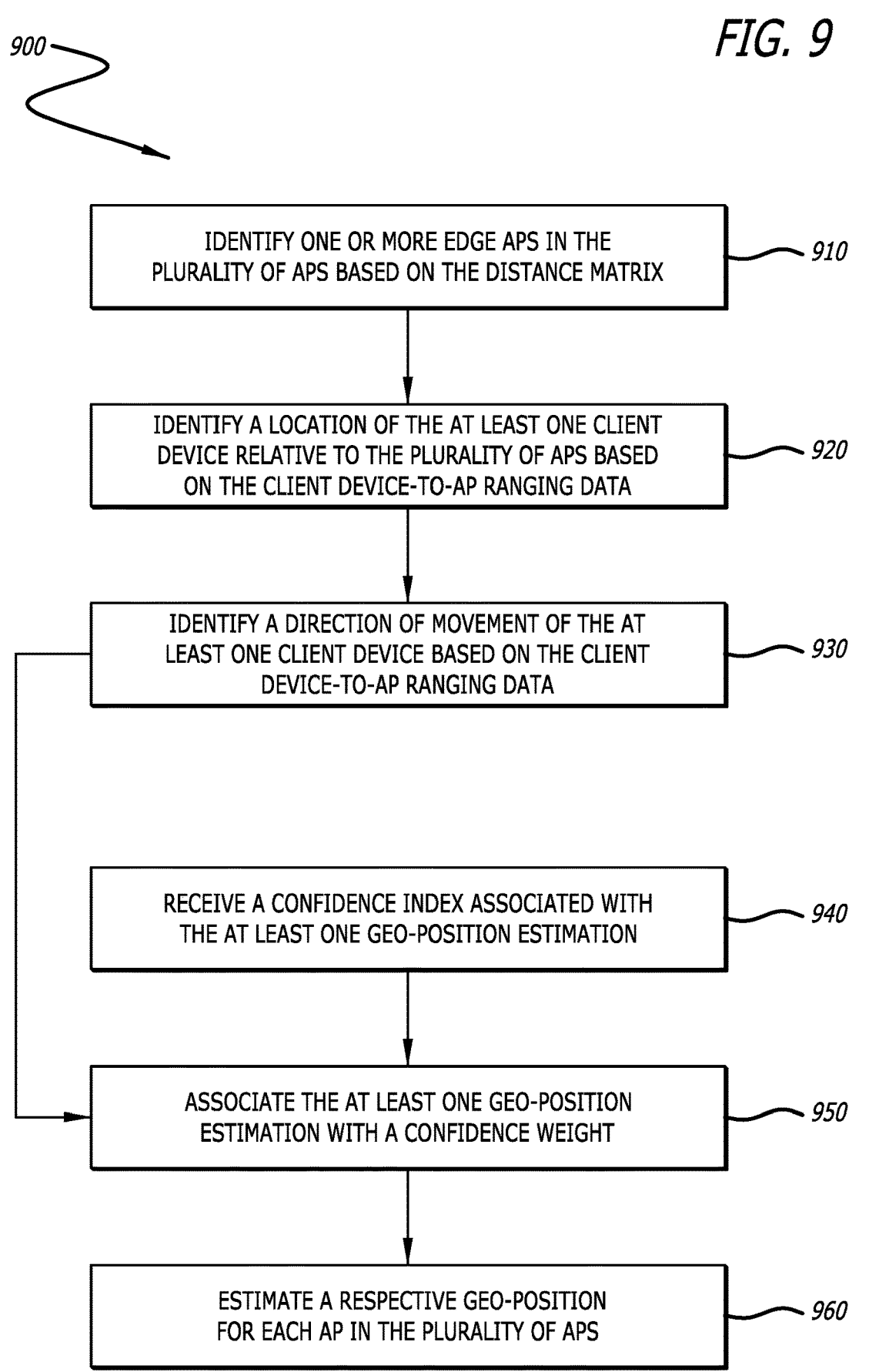

900

IDENTIFY ONE OR MORE EDGE APS IN THE PLURALITY OF APS BASED ON THE DISTANCE MATRIX — 910

IDENTIFY A LOCATION OF THE AT LEAST ONE CLIENT DEVICE RELATIVE TO THE PLURALITY OF APS BASED ON THE CLIENT DEVICE-TO-AP RANGING DATA — 920

IDENTIFY A DIRECTION OF MOVEMENT OF THE AT LEAST ONE CLIENT DEVICE BASED ON THE CLIENT DEVICE-TO-AP RANGING DATA — 930

RECEIVE A CONFIDENCE INDEX ASSOCIATED WITH THE AT LEAST ONE GEO-POSITION ESTIMATION — 940

ASSOCIATE THE AT LEAST ONE GEO-POSITION ESTIMATION WITH A CONFIDENCE WEIGHT — 950

ESTIMATE A RESPECTIVE GEO-POSITION FOR EACH AP IN THE PLURALITY OF APS — 960

AP LOCALIZATION BASED ON CLIENT ANCHORING

The present disclosure relates to wireless networking. More particularly, the present disclosure relates to improving the accuracy of access point (AP) location in a Wi-Fi network using client device data and AP ranging measurements.

BACKGROUND

In the field of wireless networking, access points (APs) play a crucial role in providing Wi-Fi coverage. The APs may typically be deployed across a floor or a building, and they can communicate with client devices within their range. Knowing the precise location of the APs has become increasingly important in modern Wi-Fi networks, especially for tasks such as, but not limited to, network optimization, troubleshooting, and automatic frequency coordination (AFC). For example, an AP may need to report its location in order to receive the list of channels that it can use at standard power.

One common approach to determine the location of APs is to equip each AP with a global navigation satellite system (GNSS) receiver, such as a global positioning system (GPS) receiver. However, this approach has several limitations. For instance, indoor GPS satellite reception is often poor, particularly in buildings with thick walls or limited access to windows. As a result, APs not located near windows or at the edge of the floor may be unable to receive satellite data. Even then, the data received is often partial and insufficient for accurate location determination.

Furthermore, while client devices often incorporate GPS and other location techniques, their location accuracy can decrease as they move deeper inside the building and away from a good external source of location, such as, but not limited to, cellular triangulation or GPS. On the other hand, APs can range to one another and do not move. However, the challenge lies in effectively utilizing this ranging data and the location data from client devices. The current approaches struggle to provide a comprehensive and accurate location determination for all APs, especially when they are deployed in complex indoor environments.

SUMMARY OF THE DISCLOSURE

In response to the problems described above, devices and methods are discussed herein that improve the accuracy of access point (AP) location in a Wi-Fi network using client device data and AP ranging measurements. In some embodiments, a network node includes a processor, at least one network interface controller configured to provide access to a network, and a memory communicatively coupled to the processor, wherein the memory includes a location logic. The logic is configured to receive access point (AP)-to-AP ranging data associated with a plurality of APs, receive client device-to-AP ranging data associated with at least one client device and at least some APs in the plurality of APs, receive at least one geo-position estimation associated with the at least one client device, and estimate a respective geo-position for each AP in the plurality of APs based on the AP-to-AP ranging data, the client device-to-AP ranging data, and the at least one geo-position estimation.

In some embodiments, the location logic is further configured to identify one or more sets of APs in the plurality of APs, each set of APs in the one or more sets of APs being in a line-of-sight (LOS) condition, and construct a respective distance sub-matrix for each set of APs in the one or more sets of APs based on the AP-to-AP ranging data.

In some embodiments, wherein the location logic is further configured to determine, for at least one set of APs in the one or more sets of APs, whether the at least one set of APs is located on a same plane based on the distance sub-matrix corresponding to the at least one set of APs.

In some embodiments, wherein whether the at least one set of APs is located on the same plane is determined based on multidimensional scaling (MDS).

In some embodiments, wherein the location logic is further configured to construct a distance matrix for the plurality of APs based on the AP-to-AP ranging data.

In some embodiments, wherein the location logic is further configured to identify one or more edge APs in the plurality of APs based on the distance matrix.

In some embodiments, wherein the client device-to-AP ranging data is provided by the at least one client device via location measurement report (LMR) feedback.

In some embodiments, wherein the at least one geo-position estimation is provided by the at least one client device via an application programming interface (API).

In some embodiments, wherein the location logic is further configured to determine whether the at least one client device and each AP in the at least some APs are in a line-of-sight (LOS) condition or a non-LOS (nLOS) condition based on the client device-to-AP ranging data.

In some embodiments, the location logic is further configured to estimate a first axis of a first horizontal plane associated with a pair of APs in the at least some APs based on the client device-to-AP ranging data, the first horizontal plane and the at least one client device being assumed to have a same first altitude, estimate a direction of a second axis of a second horizontal plane associated with the pair of APs based on the estimated first axis of the first horizontal plane, the second horizontal plane being parallel to the first horizontal plane, the second horizontal plane and the pair of APs being assumed to have a same second altitude, and improve an accuracy of a distance matrix for the plurality of APs based on the estimated direction of the second axis of the second horizontal plane and the client device-to-AP ranging data.

In some embodiments, the location logic is further configured to identify a location of the at least one client device relative to the plurality of APs based on the client device-to-AP ranging data, identify a direction of movement of the at least one client device based on the client device-to-AP ranging data, and associate the at least one geo-position estimation with a confidence weight based on the identified location and the identified direction of movement of the at least one client device.

In some embodiments, the location logic is further configured to receive a confidence index associated with the at least one geo-position estimation, and associate the at least one geo-position estimation with a confidence weight based on the received confidence index.

In some embodiments, the received confidence index is based at least in part on whether the at least one client device is able to compute its own global navigation satellite system (GNSS) position.

In some embodiments, the respective geo-position for each AP in the plurality of APs is estimated beginning from an edge of the plurality of APs and then proceeding inward.

In some embodiments, a network node, wherein the AP-to-AP ranging data is based on fine timing measurement (FTM) or ultra-wideband (UWB).

In some embodiments, the location logic is further configured to transmit an indication of the respective geo-position to each AP in the plurality of APs.

In some embodiments, the network node corresponds to at least one of a controller, a location server, or an AP in the plurality of APs.

In some embodiments, an access point (AP), includes a processor, at least one network interface controller configured to provide access to a network, and a memory communicatively coupled to the processor, wherein the memory includes a location logic. The logic is configured to measure one or more distances to one or more other APs based on a ranging technique, receive an indication of a distance between at least one client device and the AP from the at least one client device, receive an indication of a geo-position of the at least one client device from the at least one client device, transmit an indication of the one or more distances to the one or more other APs, the indication of the distance between the at least one client device and the AP, and the indication of the geo-position of the at least one client device to a network node, and receive an indication of a geo-position of the AP from the network node.

In some embodiments, the indication of the distance between the at least one client device and the AP is received via location measurement report (LMR) feedback.

In some embodiments, a method for estimating an access point (AP) geo-position includes receiving AP-to-AP ranging data associated with a plurality of APs, receiving client device-to-AP ranging data associated with at least one client device and at least some APs in the plurality of APs, receiving at least one geo-position estimation associated with the at least one client device, and estimating a respective geo-position for each AP in the plurality of APs based on the AP-to-AP ranging data, the client device-to-AP ranging data, and the at least one geo-position estimation.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 7 is a flowchart showing a process for estimating the geo-position of APs in accordance with various embodiments of the disclosure;

FIG. 8 is a flowchart showing a process for improving the accuracy of a distance matrix for a plurality of APs in accordance with various embodiments of the disclosure;

FIG. 9 is a flowchart showing a process for estimating the geo-position of APs in accordance with various embodiments of the disclosure.

Figure 1:
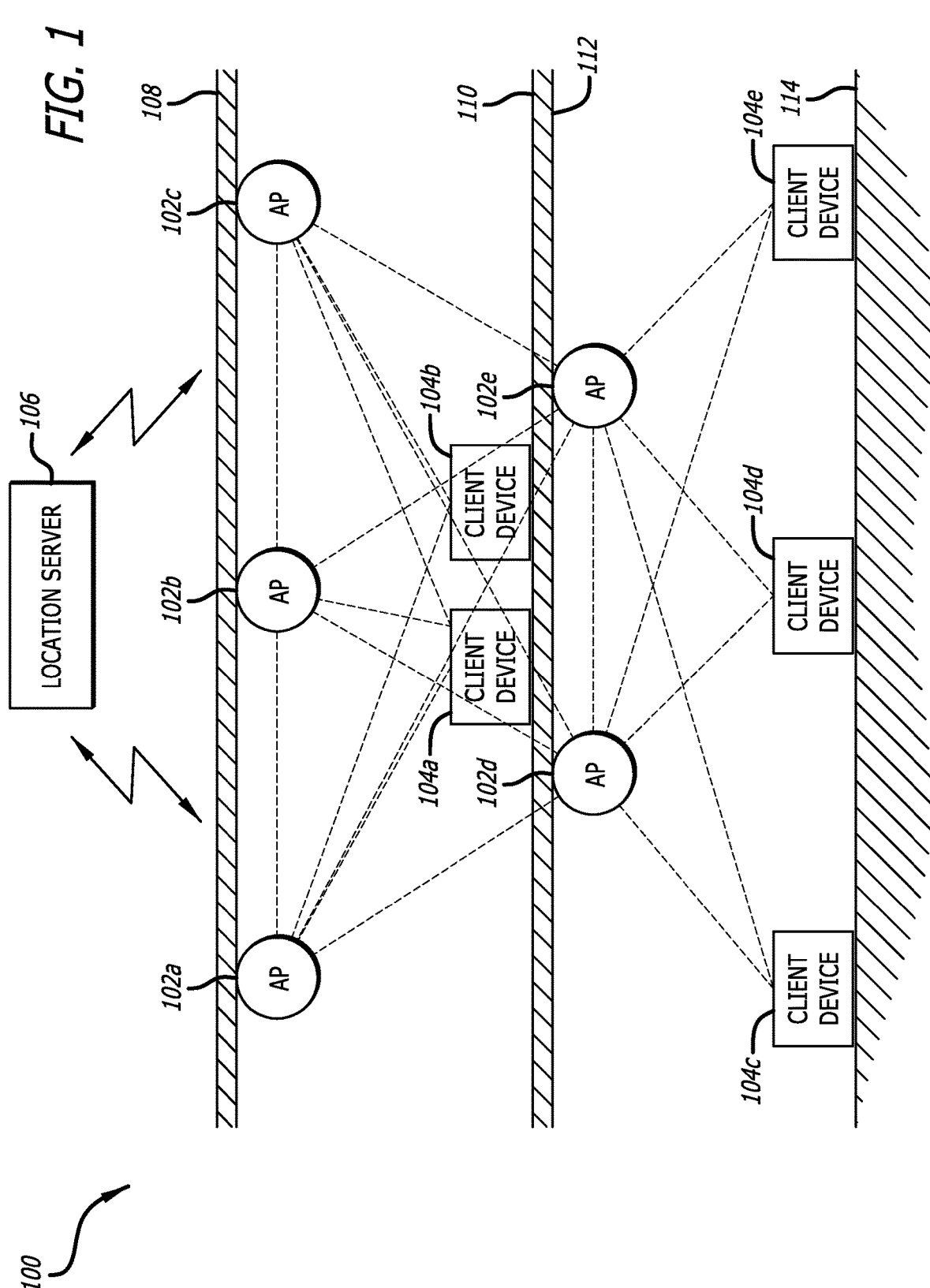
FIG. 1 is a diagram illustrating a Wi-Fi network setup across multiple floors in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that leverage client device data and access point (AP) ranging measurements to improve the accuracy of AP geo-position in a Wi-Fi network. In many embodiments, APs may be deployed across one or more floors of a building. The APs can range to one another using techniques such as, but not limited to, fine timing measurement (FTM) or ultra-wideband (UWB). Hereinafter ranging may refer to the process of determining the distance between two wireless devices, such as APs or client devices (e.g., AP-to-AP ranging or client device-to-AP ranging), based on signal measurements. The outcome of the ranging exchanges can be a set of noisy measurements. The measurement may form a partial matrix. By way of a non-limiting example, for N APs (where N is an integer greater than 1), the matrix dimensions may be N×N. In the matrix, some AP pairs may display (noisy) measurement values. Some other AP pairs may not be associated with any measurement values due to the two APs being too far apart to successfully range.

In a number of embodiments, techniques such as, but not limited to, semidefinite programming or multidimensional scaling (MDS) may be utilized to convert the set of AP-to-AP ranges/distances into a set of coordinates (thus, the APs may be represented in an AP-to-AP graph). However, the noise in the measurements can make it difficult to conclude if all APs are on the same plane (e.g., at or near the ceiling of a particular building floor) or on different planes. Additionally, the estimated distance between APs that are in line-of-sight (LOS) of each other can be near the ground truth. On the other hand, the measured range between APs in a non-LOS (nLOS) condition may be inflated by the obstacles between the APs. Hereinafter LOS may refer to a direct, unobstructed path between two wireless devices for signal transmission, and nLOS may refer to a scenario where the signal path between two wireless devices is obstructed by physical objects (obstacles) such as, but not limited to, walls or buildings.

In a variety of embodiments, APs that are in LOS may form distance sub-matrices. In particular, a set of APs in LOS may form a corresponding distance sub-matrix. The sub-matrices can be sufficiently accurate for techniques such as MDS to resolve the AP location and conclude on a two-dimensional (2D) or three-dimensional (3D) space. A set of APs may be in a 2D space when the set of APs is on a same plane (e.g., at or near the ceiling of a particular building floor). On the other hand, a set of APs may be in a 3D space when the set of APs is on different planes (e.g., on different floors of the building). APs forming 2D groups can be grouped in priority. In some embodiments, some APs may have partial LOS ranging to other AP groups, and they can form their respective sub-matrices. In other words, some APs may be associated with more than one sub-matrix.

In more embodiments, all APs in range of one another, including APs in LOS and nLOS conditions, may form a larger distance matrix. The larger distance matrix may be noisier due to the presence of nLOS conditions. At this point, a resolver (e.g., an MDS resolver) may not know whether the matrix corresponds to APs in a 2D space or a 3D space. The matrix can also be incomplete (i.e., a partial matrix) because some APs can be out of range of each other. In additional embodiments, geometric rules can be utilized to find (detect) APs that are at the edge of the group (the edge of the group corresponding to the edge of the coverage zone of the APs).

In further embodiments, client devices in range may also range to the APs. Each client device may return to each in-range AP its location measurement report (LMR) feedback. The LMR feedback can include the client device's measured range/timers to that AP. In addition, the client device can also return its geo-position (geolocation) estimation (e.g., geographic coordinates (e.g., latitudes, longitudes, and/or altitudes) as computed based on GNSS measurements) to the network (e.g., one or more APs, a controller, a location server, a management platform etc.). The geo-position estimation may be available through an application programming interface (API). The geo-position estimation can be more accurate when the client device just enters the building. The accuracy may be maintained (e.g., utilizing dead reckoning) if a good understanding of the user's gait and direction is available. However, the accuracy may deteriorate as the client device moves deeper inside the building and away from a good external source of location data (e.g., navigation satellites or cellular base stations).

In still more embodiments, whether a client device and an AP is in an LOS condition or nLOS condition may be evaluated. A person of ordinary skill in the art would understand that there may not be direct correspondence between an AP-to-AP nLOS condition and a client device-to-AP nLOS condition for the same AP pair. By way of a non-limiting example, two APs near the ceiling may be in an nLOS condition because of obstacles between them, while at the same the obstacles may not affect the signals between a client device on the floor and either of the two APs (in other words, the client device and either of the two APs may be in an LOS condition).

In still further embodiments, the client device-to-AP range and the client device geo-position estimation may be returned to a location server along with the AP-to-AP matrices. In more embodiments, the respective geo-position for each AP in a plurality of APs can be estimated beginning from an edge of the plurality of APs and then proceeding inward. In still additional embodiments, the location server may be implemented within one or more of the APs, or may be implemented at an external system (e.g., a controller). The location server can receive indications that a client device ranges to multiple APs in (fast) succession. That is, in a series of measurements, the geo-position estimation reported by the client device may not change noticeably as the client device ranges to one AP, then to the next AP, and so on. Accordingly, a client device may be associated with a single geo-position as well as one or more ranges (e.g., 2, 3, . . . ranges) to the APs.

In some more embodiments, because two client devices may be unlikely to range to the same two APs from the exact same location, for each pair of APs, the location server can collect sets of ranging measurements and geo-position estimations from multiple passing client devices. In certain embodiments, based on the client device-to-AP ranging measurements and the series of client device-reported geo-position estimations, the location server may compute the likely axis of the floor between the two APs (where the client devices can be assumed to be at or near the floor). Because the ceiling is likely to be parallel to the floor, the location server can also deduce the direction of the ceiling axis based on the axis of the floor. The APs can be assumed to be at or near the ceiling. Then, in yet more embodiments, the location server may utilize the LOS client device-to-AP ranging measurements and geometric rules to refine the accuracy of the AP-to-AP graph.

In still yet more embodiments, the location server may not directly know the accuracy of the client device-returned geo-position estimation. The location server may also not know individual client device identities as client devices may be rotating their medium access control (MAC) addresses at each ranging burst. However, in many further embodiments, the location server can know which APs receive the largest count of client device ranging requests per time interval. The location server may also know, for individual time intervals, statistical paths taken by client device ranges. By way of a non-limiting example, in most building settings, a client device may be more likely to start ranging from the time the user enters the building. The ranging may continue until the time when the user finds the target room, where the ranging may then stop. Further, the client device may start ranging again as the user tries to move to the next room or the building exit. This data may allow the location server to observe a series of succession of ranges and to compare the series to the AP-to-AP graph.

In many additional embodiments, the location server, at the scale of a time interval, can observe a series of succession of ranges, and can compare this series to the AP-to-AP graph, to determine if the ranges can be determined as corresponding to the client device moving inward or outward with respect to the coverage area of all the APs. In particular, the client device moving inward may mean that the client device is moving from the edge of the AP-to-AP graph toward the interior, and vice versa. In still yet further embodiments, when inward or outward movements of a client device are found, the matching geo-position measurement reported by the client device may be assigned with a confidence weight by the location server. Geo-position estimations reported at the edge of the AP-to-AP graph may be assigned with higher confidence weights than those reported further inside. This is because geo-position estimations reported at the edge of the AP-to-AP graph are more likely to have been reported by the client devices that recently entered the building, and thus still have a better accuracy in their geo-position estimation. Some client devices may also report (e.g., depending on the operating system), along with the client device geo-position estimation, an associated confidence index computed internally at the client device. In still yet additional embodiments, the confidence index provided by the client device may replace or complement the confidence weight assigned by the location server. In several embodiments, the client device can also report if it is able to compute a geo-position based on GNSS measurements (e.g., factored into the confidence index or utilizing a standalone indication).

In several more embodiments, the location server may combine the AP-to-AP LOS (sub-) matrices with the matrices formed from the client device-to-AP LOS ranges in order to refine the AP-to-AP graph. In particular, the location server may start from the LOS ranges for APs and client devices at the edge of the AP-to-AP graph, and then may proceed inward. It is likely that inward values are noisier than edge values. In numerous embodiments, the location server can use geometry rules and iterative attempts to build back the likely plane value of AP pairs (e.g., the distance matrix may be resolved to determine whether the APs are in a 2D space or a 3D space, and, if the APs are in a 3D space, which APs are likely to be on the same plane). Further, the location server can refine the estimates of the most likely distances between APs, including APs that were not previously in the same sub-matrix (i.e., APs not in the LOS condition). Moreover, the location server can determine the most likely geo-positions of the APs. In particular, the location server may start from the APs at the edge and then proceed inward.

Accordingly, in numerous additional embodiments, an AP may measure one or more distances to one or more other APs based on a ranging technique. The AP may receive an indication of a distance between at least one client device and the AP from the at least one client device. Further, the AP may receive an indication of a geo-position of the at least one client device from the at least one client device. Moreover, the AP may transmit an indication of the one or more distances to the one or more other APs, the indication of the distance between the at least one client device and the AP, and the indication of the geo-position of the at least one client device to a location server. Further still, the AP may receive an indication of a geo-position of the AP from the location server.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram illustrating a Wi-Fi network setup 100 across multiple floors in accordance with various embodiments of the disclosure is shown. The embodiments depicted in FIG. 1 include APs 102a, 102b, 102c, 102d, 102e and client devices 104a, 104b, 104c, 104d, 104e distributed across two floors of a building. In many embodiments, APs 102a, 102b, and 102c, along with client devices 104a and 104b, may be located on a higher floor. The APs can be positioned at or near the ceiling 108 of this floor, while the client devices may be at or near the floor 110. On a lower floor, APs 102d and 102e, and client devices 104c, 104d, and 104e can be situated. Similar to the higher floor, the APs on the lower floor may be at or near the ceiling 112, and the client devices can be at or near the floor 114.

In a number of embodiments, the APs across both floors may engage in AP-to-AP ranging. In other words, the APs can determine the distance between each other based on signal measurements. A partial matrix of distances can be constructed based on the AP-to-AP ranging. The distance matrix may be transformed and represented in an AP-to-AP graph utilizing techniques such as, but not limited to, semidefinite programming or MDS. However, due to the noise in the measurements and the presence of both LOS and nLOS conditions, it can be challenging to determine if all APs are on the same plane or different planes based just on the AP-to-AP ranging measurements.

In a variety of embodiments, APs that are in LOS may form distance sub-matrices, which can be sufficiently accurate for techniques such as MDS to resolve the AP location and conclude on a 2D or 3D space. By way of a non-limiting example, the APs 102a, 102b, and 102c on the higher floor may be in the LOS condition with respect to each other. Accordingly, a distance sub-matrix may be constructed for the APs 102a, 102b, and 102c. Further, a resolver (e.g., an MDS resolver) may identify that the APs 102a, 102b, and 102c are in a 2D space (i.e., on a same plane). This is consistent with the ground truth that the APs 102a, 102b, and 102c are at or near a same ceiling 108.

In some embodiments, client devices can also participate in ranging to the APs. By way of non-limiting examples, the client devices 104a and 104b may each range to each of the APs 102a, 102b, and 102c. Similarly, the client devices 104c, 104d, and 104e may each range to each of the APs 102d and 102e. Although not shown in the embodiments depicted in FIG. 1, client devices may also range to APs in nLOS conditions. By way of a non-limiting example, one or both of the client devices 104a and 104b may range to one or both the APs 102d and 102e. In more embodiments, each participating client device may return its LMR feedback. The LMR feedback can include the client device's measured range to that AP. Each participating client device can also return the geo-position estimation of the client device (e.g., geographic coordinates computed based on GNSS measurements).

In additional embodiments, the client device-to-AP ranging and client device geo-position estimation data may be forwarded or returned to a location server 106 (e.g., via one or more APs), along with the AP-to-AP ranging measurements or AP-to-AP (sub-) matrices. In further embodiments, the location server 106 can use the data to compute, for each pair of APs, the likely axis of the floor between the two APs. The location server 106 may further compute the direction of the ceiling axis, where the ceiling may be presumed to be parallel to the floor.

In still more embodiments, the location server 106 may combine the AP-to-AP LOS sub-matrices with the matrices formed from the client device-to-AP LOS ranges to refine the accuracy of the AP-to-AP graph. In particular, the location server 106 can utilize geometry rules and iterative attempts to build back the likely plane value of AP pairs. Moreover, in still further embodiments, the location server 106 may refine the estimates of the most likely distances between APs, including APs that were not previously associated with the same sub-matrix (i.e., APs in nLOS). Furthermore, in still additional embodiments, the location server 106 can determine the most likely geo-positions of the APs.

Although a specific embodiment for a Wi-Fi network setup across multiple floors suitable for carrying out the various steps, processes, methods, and operations described herein is discussed with respect to FIG. 1, any of a variety of systems and/or processes may be utilized in accordance with embodiments of the disclosure. For example, the APs and client devices can be utilized in a system where the APs are distributed across a large open-space environment such as a warehouse or a factory. The elements depicted in FIG. 1 may also be interchangeable with other elements of FIGS. 2-10 as required to realize a particularly desired embodiment.

Figure 2:
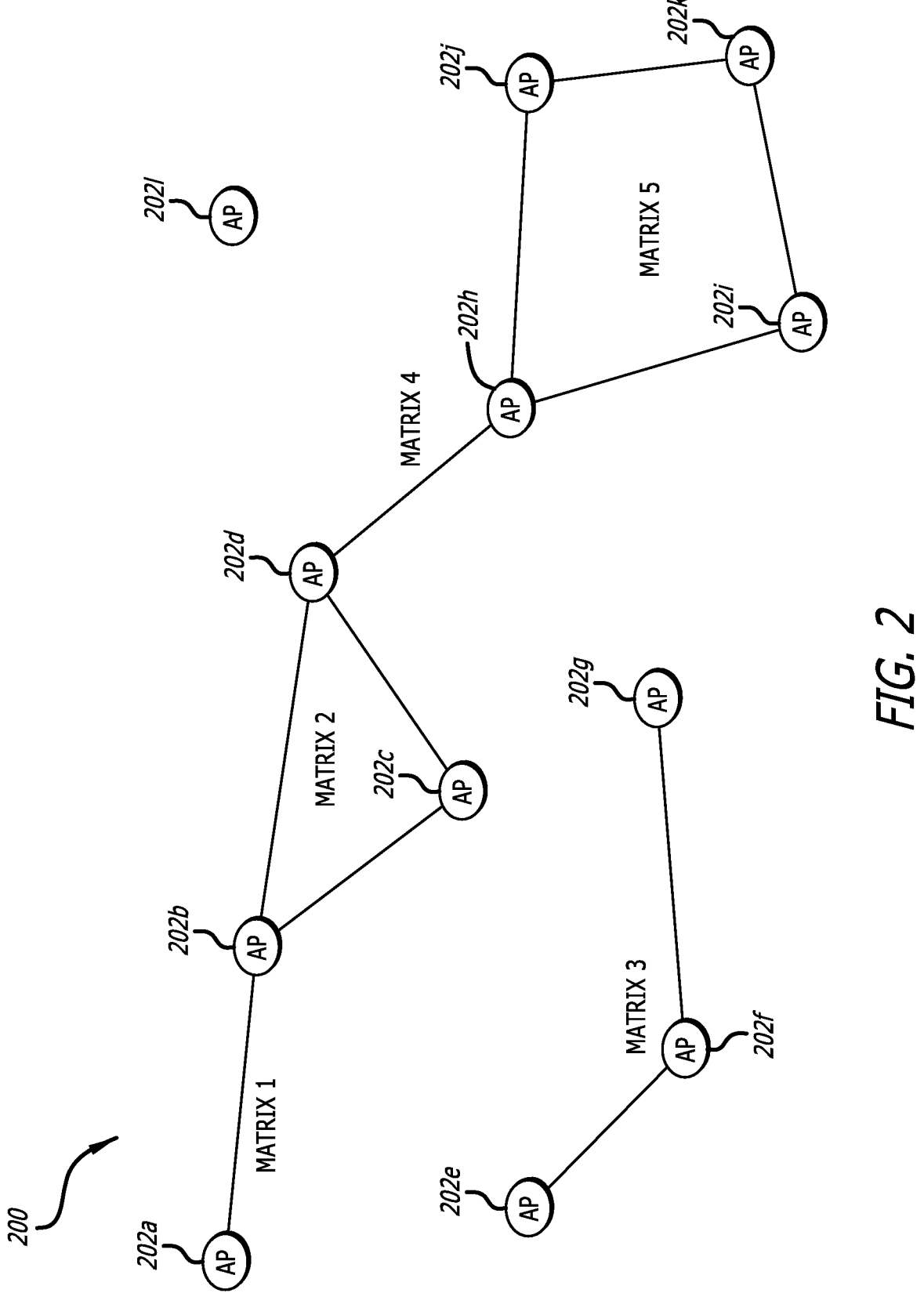
FIG. 2 is a diagram illustrating the formation of sub-matrices for access points (APs) in line-of-sight (LOS) in accordance with various embodiments of the disclosure.

Referring to FIG. 2, a diagram 200 illustrating the formation of sub-matrices for APs in LOS in accordance with various embodiments of the disclosure is shown. The embodiments depicted in FIG. 2 include twelve APs: 202a, 202b, 202c, 202d, 202e, 202f, 202g, 202h, 202i, 202j, 202k, and 202l. In many embodiments, the AP-to-AP ranging data for APs that are in the LOS condition with each other may form sub-matrices. By way of non-limiting examples, APs 202a and 202b are in LOS with each other, and the associated ranging data may form sub-matrix 1. Similarly, APs 202b, 202c, and 202d are in LOS, and the associated ranging data may form sub-matrix 2. APs 202e, 202f, and 202g are in LOS, and the associated ranging data may form sub-matrix 3. APs 202d and 202h are in LOS, and the associated ranging data may form sub-matrix 4. Lastly, APs 202h, 202i, 202j, and 202k are in LOS, and the associated ranging data may form sub-matrix 2.

In a number of embodiments, some APs can belong in different LOS AP sets and therefore can straddle different sub-matrices. By way of non-limiting examples, AP 202b may be associated with both sub-matrix 1 and sub-matrix 2, and AP 202d may be associated with both sub-matrix 2 and sub-matrix 4. Further, AP 202h may be associated with both sub-matrix 4 and sub-matrix 5. The overlapping can provide additional data points for refining the geo-position estimations of the APs. In a variety of embodiments, there may be APs that are not associated with any sub-matrix. By way of a non-limiting example, AP 202l may not be in LOS with any other AP and therefore is not associated with any sub-matrix.

In some embodiments, the sub-matrices can be utilized to refine the accuracy of the AP-to-AP graph. By focusing on APs in LOS with each other, the noise in the measurements can be limited, and techniques such as, but not limited to, MDS can be utilized to resolve the AP location and conclude on a 2D or 3D space. Additionally, in more embodiments, the LOS sub-matrices can be combined with LOS client device-to-AP ranging data for further refinement of the AP-to-AP graph. By way of a non-limiting example, a location server can determine and/or improve the estimation accuracy of the most likely geo-positions of the APs based on the LOS sub-matrices and the LOS client device-to-AP ranging data, as well as geo-position estimations of the client devices.

Although a specific embodiment for the formation of sub-matrices for APs in LOS suitable for carrying out the various steps, processes, methods, and operations described herein is discussed with respect to FIG. 2, any of a variety of systems and/or processes may be utilized in accordance with embodiments of the disclosure. For example, the sub-matrix approach can be applied in a system where the APs are part of a dynamic network configuration, where the ranging measurements and geo-position estimations can be utilized to adaptively reconfigure the network for optimal performance based on real-time traffic and usage patterns. The elements depicted in FIG. 2 may also be interchangeable with other elements of FIGS. 1 and 3-10 as required to realize a particularly desired embodiment.

Figure 3:
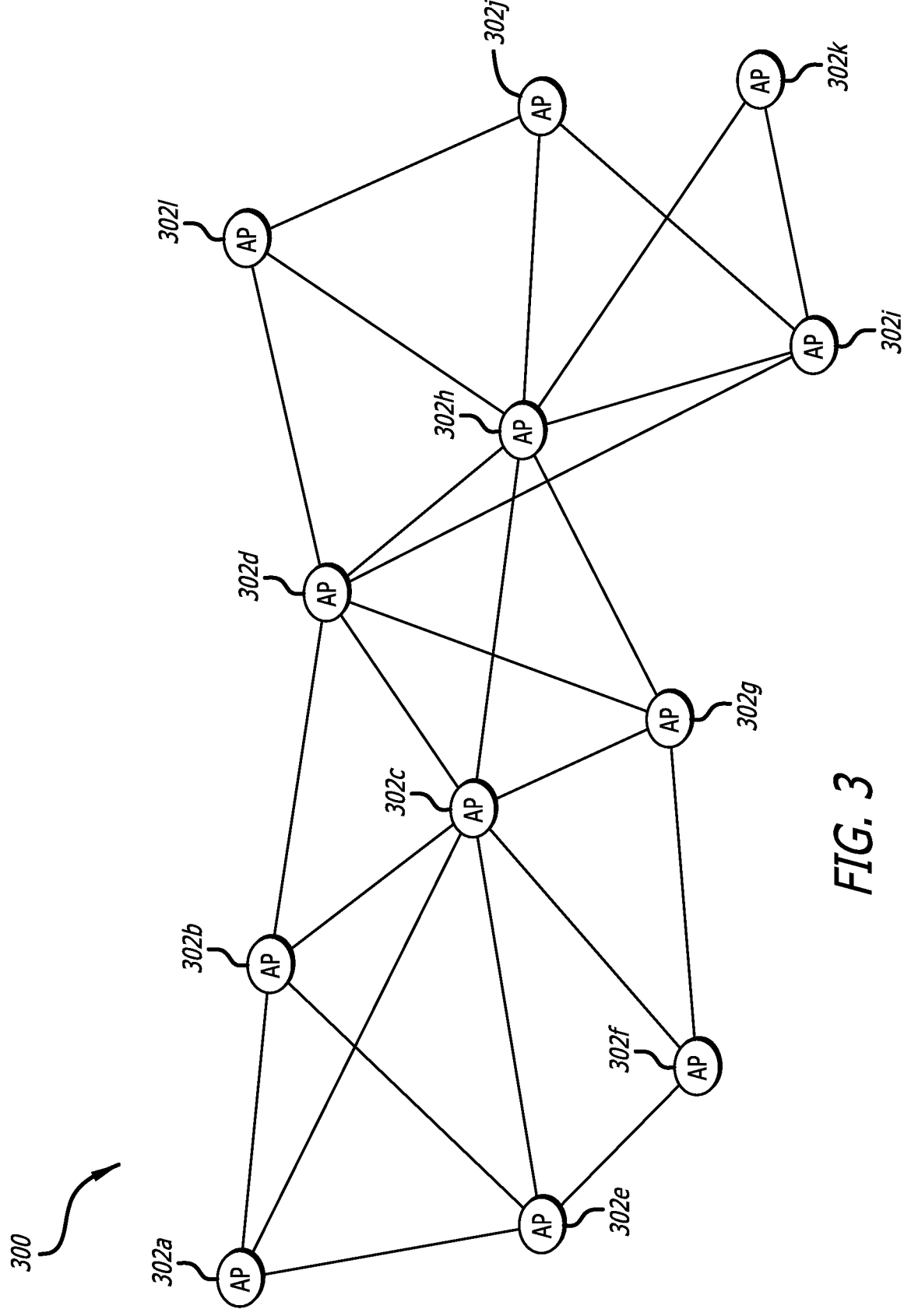
FIG. 3 is a diagram illustrating the distance matrix for all APs in accordance with various embodiments of the disclosure.

Referring to FIG. 3, a diagram 300 illustrating the distance matrix for all APs in accordance with various embodiments of the disclosure is shown. The embodiments depicted in FIG. 3 include APs 302a, 302b, 302c, 302d, 302e, 302f, 302g, 302h, 302i, 302j, 302k, and 302l, and their respective distance measurements to each other, where available. The APs 302a, 302b, 302c, 302d, 302e, 302f, 302g, 302h, 302i, 302j, 302k, and 302l may correspond to the APs 202a, 202b, 202c, 202d, 202e, 202f, 202g, 202h, 202i, 202j, 202k, and 202l, respectively. In many embodiments, the distance matrix can be transformed (e.g., using semidefinite programming or MDS, etc.) as an AP-to-AP graph, where each AP is a node and the distance between two APs can be represented as an edge.

In a number of embodiments, the distance matrix may be a partial matrix as not all AP pairs are sufficiently close to each other to obtain ranging measurements. By way of a non-limiting example, for AP 302a, the distance matrix has ranging measurements just to APs 302b, 302c, and 302e. Other APs may not be sufficiently close to AP 302a for ranging. The partial matrix can reflect the real-world conditions where not all APs can range with each other due to physical distance or obstructions. In a variety of embodiments, as described in further detail herein, the AP-to-AP paragraph can be refined based on client device-to-AP ranging data as well as geo-position estimations of client devices.

Although a specific embodiment for the distance matrix of all APs suitable for carrying out the various steps, processes, methods, and operations described herein is discussed with respect to FIG. 3, any of a variety of systems and/or processes may be utilized in accordance with embodiments of the disclosure. For example, the APs may be part of a security infrastructure within a building, and the ranging measurements and geo-position estimations can be utilized to enhance the precision of location-based security protocols and alerts. The elements depicted in FIG. 3 may also be interchangeable with other elements of FIGS. 1, 2, and 4-10 as required to realize a particularly desired embodiment.

Figure 4:
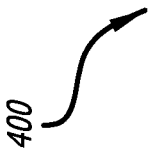
FIG. 4 is a diagram illustrating the interaction between APs and client devices in accordance with various embodiments of the disclosure.

Referring to FIG. 4, a diagram 400 illustrating the interaction between APs and client devices in accordance with various embodiments of the disclosure is shown. The embodiments depicted in FIG. 4 include APs 402 and 404, which may be positioned at or near the ceiling 410, and multiple client devices 406 that can be situated at or near the floor 412. In many embodiments, each of the client devices 406 may conduct ranging to both APs 402 and 404. In particular, the client devices can measure the distance to each AP based on signal measurements.

In a number of embodiments, a location server may receive each client device's ranging measurements to the two APs, along with the client device's geo-position estimation. The geo-position estimation can be derived from various approaches, such as GNSS measurements. A client device 406 may return the ranging measurement to the AP 402 and/or 404 via LMR feedback. Further, the client device's geo-position estimation can be retrieved utilizing an API.

In a variety of embodiments, the location server can utilize the data provided by the client devices 406 to determine the (likely) axis of the floor 412 and subsequently, the direction of the axis of the ceiling 410, assuming that the ceiling 410 is parallel to the floor 412. In some embodiments, the two APs 402 and 404 may have an initial ranging measurement between each other. The location server can refine the distance estimation 408 between the two APs 402 and 404 based on the data provided by the client devices 406. By integrating the client device-to-AP ranging data with the initial AP-to-AP ranging data and utilizing the geo-position estimations of the client devices 406, the location server can further refine the accuracy of the AP-to-AP graph and more accurately determine the geo-positions of the APs 402 and 404.

Although a specific embodiment for the interaction between APs and client devices suitable for carrying out the various steps, processes, methods, and operations described herein is discussed with respect to FIG. 4, any of a variety of systems and/or processes may be utilized in accordance with embodiments of the disclosure. For example, the interaction between APs and client devices may be applied in a system where the APs are part of a smart building infrastructure, where the ranging measurements and geo-position estimations can be utilized to enhance the precision of location-based services such as indoor navigation or asset tracking. The elements depicted in FIG. 4 may also be interchangeable with other elements of FIGS. 1-3 and 5-10 as required to realize a particularly desired embodiment.

Figures 5A, 5B:
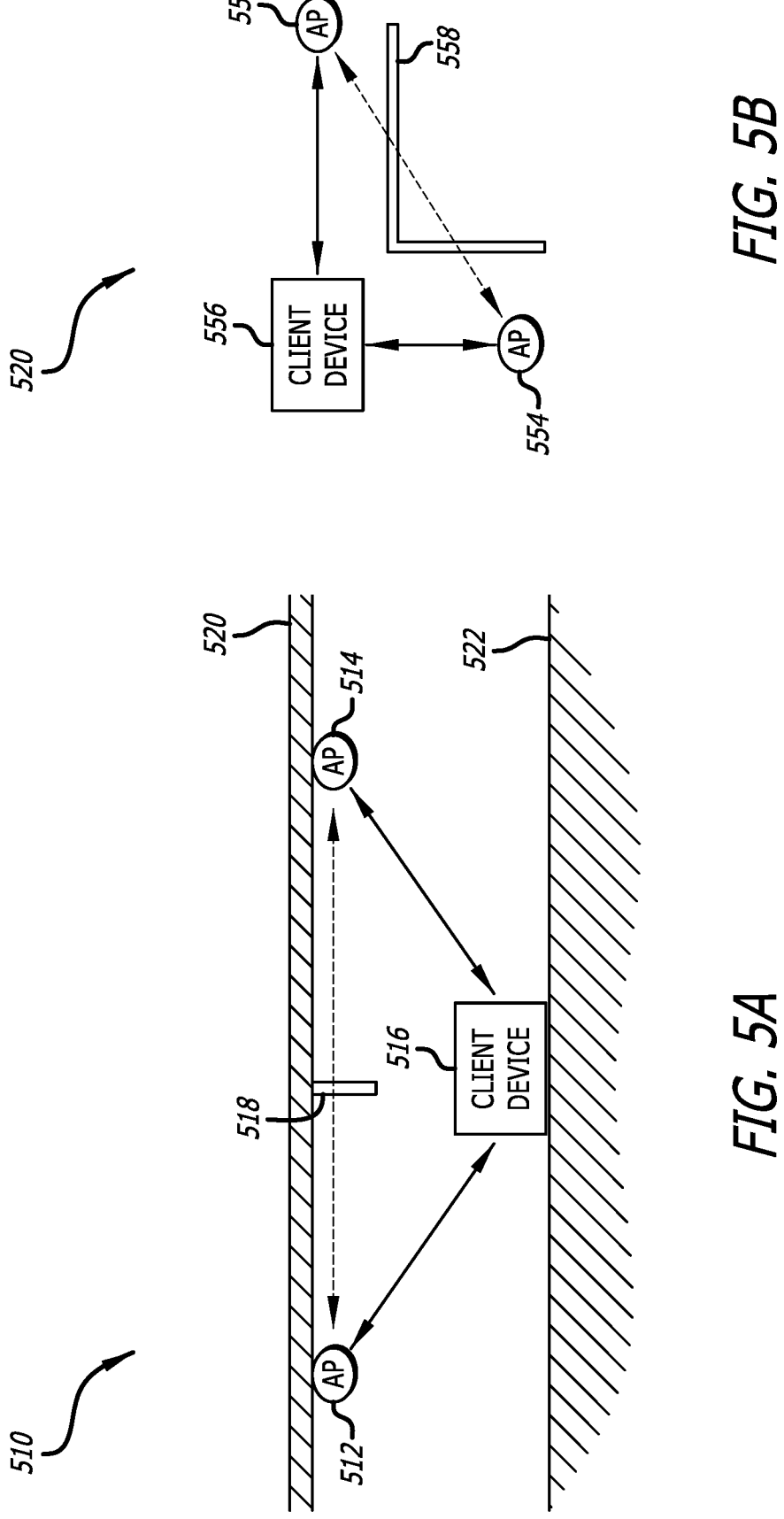
FIG. 5A is a diagram illustrating the relationship between APs and a client device in the presence of a physical obstruction in accordance with various embodiments of the disclosure.
FIG. 5B is a diagram illustrating the relationship between APs and a client device in the presence of a physical obstruction in accordance with various embodiments of the disclosure.

Referring to FIG. 5A, a diagram 510 illustrating the relationship between APs and a client device in the presence of a physical obstruction in accordance with various embodiments of the disclosure is shown. The embodiments depicted in FIG. 5A may include APs 512 and 514, which may be positioned at or near the ceiling 520, and a client device 516 that may be situated at or near the floor 522. A firewall door frame 518 can be located between the two APs 512 and 514. In many embodiments, the presence of the firewall door frame 518 can result in the two APs 512 and 514 being in nLOS with each other. This means that there may be a physical obstruction, in this case, the firewall door frame 518, that can prevent a direct signal path between the two APs.

In a number of embodiments, despite the nLOS condition between the two APs 512 and 514, the client device 516 may be in LOS with both APs 512 and 514. This means that there may be a direct signal path between the client device 516 and each of the APs 512 and 514, despite the presence of the firewall door frame 518. Accordingly, the embodiments of FIG. 5A illustrate that an nLOS condition between two APs may not imply an nLOS condition between a client device and the APs.

Although a specific embodiment for the relationship between APs and a client device in the presence of a physical obstruction suitable for carrying out the various steps, processes, methods, and operations described herein is discussed with respect to FIG. 5A, any of a variety of systems and/or processes may be utilized in accordance with embodiments of the disclosure. For example, the interaction between APs and client devices may be applied in a system where the APs are part of a building's internet-of-things (IoT) infrastructure, where the ranging measurements and geo-position estimations can be utilized to enhance the precision of location-based automation and control of IoT devices. The elements depicted in FIG. 5A may also be interchangeable with other elements of FIGS. 1-4 and 5B-10 as required to realize a particularly desired embodiment.

Referring to FIG. 5B, a diagram 550 illustrating the relationship between APs and a client device in the presence of a physical obstruction in accordance with various embodiments of the disclosure is shown. The embodiments depicted in FIG. 5B may include APs 552 and 554, and a client device 556. A right-angled wall 558 may be located between the two APs 552 and 554. In many embodiments, the presence of the right-angled wall 558 can result in the two APs 552 and 554 being in nLOS with each other. This means that there may be a physical obstruction, in this case, the right-angled wall 558, that can prevent a direct signal path between the two APs 552 and 554.

In a number of embodiments, despite the nLOS condition between the two APs 552 and 554, the client device 556 may be in LOS with both APs 552 and 554. This means that there may be a direct signal path between the client device 556 and each of the APs 552 and 554, despite the presence of the right-angled wall 558. Accordingly, the embodiments of FIG. 5B illustrate that an nLOS condition between two APs may not imply an nLOS condition between a client device and the APs.

Although a specific embodiment for the relationship between APs and a client device in the presence of a physical obstruction suitable for carrying out the various steps, processes, methods, and operations described herein is discussed with respect to FIG. 5B, any of a variety of systems and/or processes may be utilized in accordance with embodiments of the disclosure. For example, the interaction between APs and client devices can be applied in a system where the APs are part of a building's indoor positioning system, where the ranging measurements and geo-position estimations can be utilized to enhance the precision of indoor positioning for visually impaired individuals using assistive technologies. The elements depicted in FIG. 5B may also be interchangeable with other elements of FIGS. 1-5A and 6-10 as required to realize a particularly desired embodiment.

Figure 6:
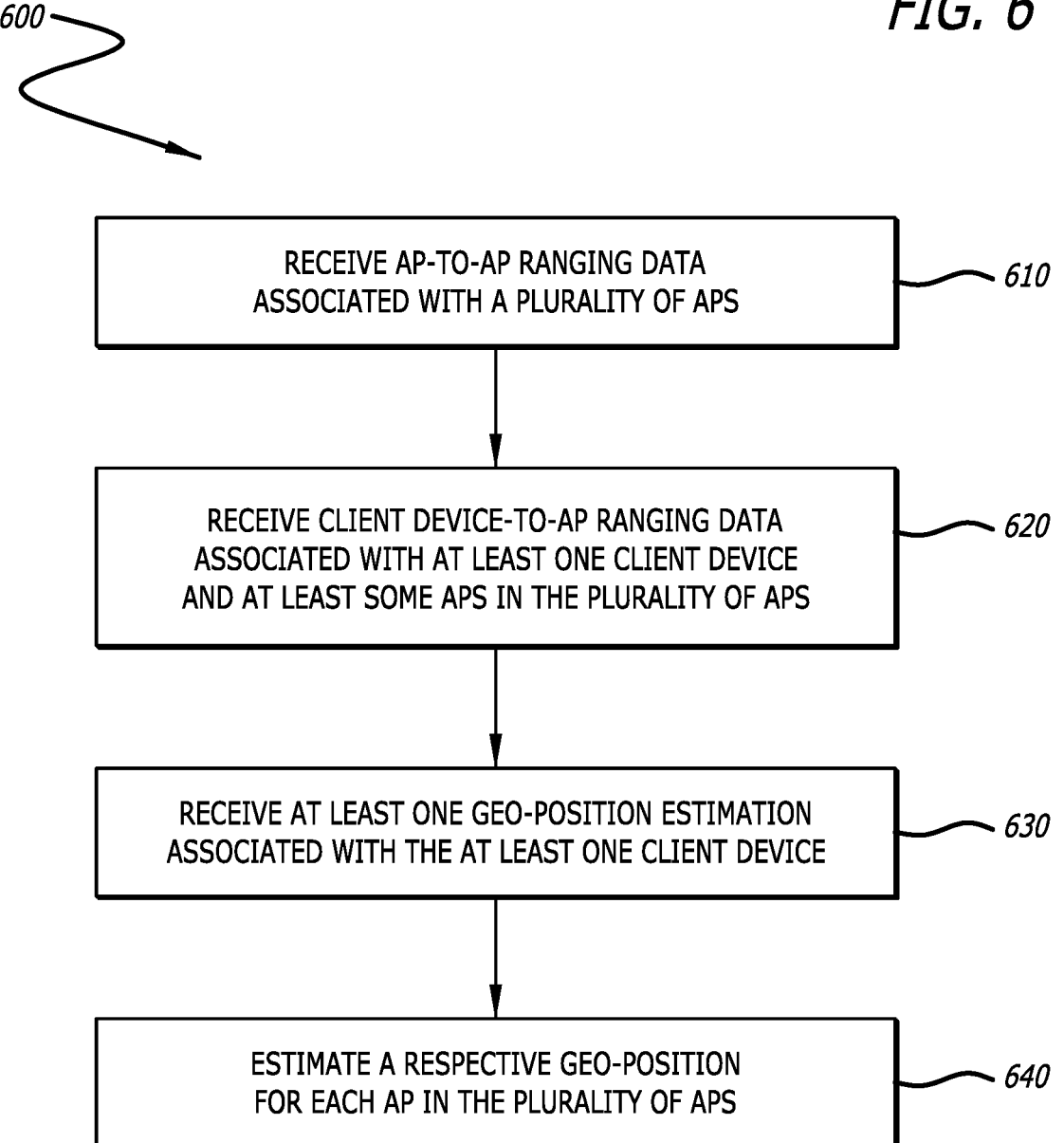
FIG. 6 is a flowchart showing a process for estimating the geo-position of APs in accordance with various embodiments of the disclosure.

Referring to FIG. 6, a flowchart showing a process 600 for estimating the geo-position of APs in accordance with various embodiments of the disclosure is shown. In many embodiments, the process 600 may receive AP-to-AP ranging data associated with a plurality of APs (block 610). The AP-to-AP ranging data can be obtained through various techniques, such as, but not limited to, FTM or UWB. The AP-to-AP ranging data can relate to the distances between different APs.

In a number of embodiments, the process 600 may receive client device-to-AP ranging data associated with at least one client device and at least some APs in the plurality of APs (block 620). This data can be provided by the client device via LMR feedback. The client device-to-AP ranging data may relate to the distances between the client device and the APs, which can be utilized to refine the AP-to-AP graph.

In a variety of embodiments, the process 600 may receive at least one geo-position estimation associated with the at least one client device (block 630). The geo-position estimation can be provided by the client device via an API. The geo-position estimation can provide a reference point for the AP-to-AP graph and for the estimation of geo-positions of the APs.

In some embodiments, the process 600 may estimate a respective geo-position for each AP in the plurality of APs (block 640). The estimation can be based on the AP-to-AP ranging data, the client device-to-AP ranging data, and the at least one geo-position estimation. The estimated geo-positions of the APs can then be used for various applications, such as, but not limited to, automatic frequency coordination (AFC).

Although a specific embodiment for estimating the geo-position of APs suitable for carrying out the various steps, processes, methods, and operations described herein is discussed with respect to FIG. 6, any of a variety of systems and/or processes may be utilized in accordance with embodiments of the disclosure. For example, the process may be applied in a system where the APs are part of a warehouse management system, where the ranging measurements and geo-position estimations can be utilized to enhance the precision of location-based inventory tracking and management. The elements depicted in FIG. 6 may also be interchangeable with other elements of FIGS. 1-5B and 7-10 as required to realize a particularly desired embodiment.

Referring to FIG. 7, a flowchart showing a process 700 for estimating the geo-position of APs in accordance with various embodiments of the disclosure is shown. In many embodiments, the process 700 may identify one or more sets of APs in the plurality of APs, where each set of APs may be in an LOS condition (block 710). The identification can be based on the AP-to-AP ranging data. The LOS condition may indicate that there is a direct signal path between the APs in each set.

In a number of embodiments, the process 700 may construct a respective distance sub-matrix for each set of APs in the one or more sets of APs based on the AP-to-AP ranging data (block 720). Some APs may be part of multiple sets of APs in LOS conditions and thus may be associated with more than one distance sub-matrix. Conversely, some APs may not be part of any identified LOS set of APs and therefore may not be associated with any distance sub-matrix.

In a variety of embodiments, the process 700 may determine whether at least one set of APs in the one or more sets of APs is located on the same plane based on the distance sub-matrix corresponding to the at least one set of APs (block 730). The determination can be made using various techniques, such as, but not limited to, MDS. If the APs in a set are located on the same plane, the knowledge can be used to further refine the AP-to-AP graph.

In some embodiments, the process 700 may construct a distance matrix for the plurality of APs based on the AP-to-AP ranging data (block 740). The distance matrix may most likely be a partial matrix, as it may not include distance data for all possible pairs of APs, especially in scenarios where certain APs are in nLOS conditions with others or are too far apart. The partial nature of the matrix can reflect the complexity and variability of real-world network environments, where not all APs may be in direct range of each other.

In more embodiments, the process 700 may determine whether at least one client device and each AP in at least some APs are in an LOS condition or an nLOS condition based on client device-to-AP ranging data (block 750). The determination of LOS or nLOS condition may be useful as it can influence the accuracy of the AP geo-position estimations. By way of a non-limiting example, if a client device and an AP are in an nLOS condition, the ranging data may be less accurate due to signal obstructions or reflections, which may need to be taken into account when estimating the geo-position of the AP.

In additional embodiments, the process 700 may estimate a respective geo-position for each AP in the plurality of APs (block 760). The estimation can be based on the AP-to-AP ranging data, the client device-to-AP ranging data, and geo-position estimation of the at least one client device. The estimated geo-positions of the APs can then be used for various applications, such as, but not limited to, AFC.

In further embodiments, the process 700 may transmit an indication of the estimated geo-position to each AP in the plurality of APs (block 770). This may allow the APs to have knowledge of their own positions. The APs may utilize the geo-position knowledge for various purposes, such as, but not limited, AFC or operation optimization.

Although a specific embodiment for estimating the geo-position of APs suitable for carrying out the various steps, processes, methods, and operations described herein is discussed with respect to FIG. 7, any of a variety of systems and/or processes may be utilized in accordance with embodiments of the disclosure. For example, the process may be applied in a system where the APs are part of a retail store's customer tracking system, where the ranging measurements and geo-position estimations can be utilized to enhance the precision of customer movement and behavior analysis. The elements depicted in FIG. 7 may also be interchangeable with other elements of FIGS. 1-6 and 8-10 as required to realize a particularly desired embodiment.

Referring to FIG. 8, a flowchart showing a process 800 for improving the accuracy of a distance matrix for a plurality of APs in accordance with various embodiments of the disclosure is shown. In many embodiments, the process 800 may construct a distance matrix for a plurality of APs based on the AP-to-AP ranging data (block 810). The distance matrix may most likely be a partial matrix, as it may not include distance data for all possible pairs of APs, especially in scenarios where certain APs are in nLOS conditions with others or are too far apart. The partial nature of the matrix can reflect the complexity and variability of real-world network environments, where not all APs may be in direct range of each other.

In a number of embodiments, the process 800 may estimate a first axis of a first horizontal plane associated with a pair of APs in the at least some APs based on the client device-to-AP ranging data (block 820). By way of a non-limiting example, the first horizontal plane may be a floor at or near which one or more client devices have ranged to the pair of APs. The first axis of a first horizontal plane can be utilized to estimate a direction of a second axis of a second horizontal plane, where the second horizontal plane may be a ceiling at or near which the pair of APs may be situated.

In a variety of embodiments, the process 800 may estimate a direction of a second axis of a second horizontal plane associated with the pair of APs based on the estimated first axis of the first horizontal plane (block 830). By way of a non-limiting example, the second horizontal plane may be a ceiling at or near which the pair of APs may be situated. The estimation may be based on an assumption that the second horizontal plane is parallel to the first horizontal plane.

In some embodiments, the process 800 may improve the accuracy of a distance matrix for the plurality of APs based on the estimated direction of the second axis of the second horizontal plane and the client device-to-AP ranging data (block 840). The improvement can be achieved by adjusting the distances in the matrix based on the estimated direction of the second axis and the client device-to-AP ranging data. Improving the accuracy of the distance matrix may lead to a more refined AP-to-AP graph, which can be utilized to improve the accuracy of AP geo-position estimations.

Although a specific embodiment for improving the accuracy of a distance matrix for a plurality of APs suitable for carrying out the various steps, processes, methods, and operations described herein is discussed with respect to FIG. 8, any of a variety of systems and/or processes may be utilized in accordance with embodiments of the disclosure. For example, the process can be applied in a system where the APs are part of a multi-story building's Wi-Fi network, where the ranging measurements and geo-position estimations can be utilized to enhance the precision of location-based services across different floors and sections of the building. The elements depicted in FIG. 8 may also be interchangeable with other elements of FIGS. 1-7, 9, and 10 as required to realize a particularly desired embodiment.

Referring to FIG. 9, a flowchart showing a process 900 for estimating the geo-position of APs in accordance with various embodiments of the disclosure is shown. In many embodiments, the process 900 may identify one or more edge APs in a plurality of APs based on a distance matrix (block 910). In particular, the distance matrix may be converted into an AP-to-AP graph (e.g., utilizing techniques such as, but not limited to, MDS), based upon which the edge APs can be identified. The edge APs may be situated at the periphery of the network, and their identification can be useful because client devices that are nearer to the periphery of the network may have more accurate geo-position estimations (e.g., based on GNSS measurements).

In a number of embodiments, the process 900 may identify a location of the at least one client device relative to the plurality of APs based on the client device-to-AP ranging data (block 920). The location of the client device relative to the plurality of APs can be determined using various techniques such as, but not limited to, triangulation or trilateration. In a variety of embodiments, the process may involve calculating the time delay of signals received from the client device at different APs, or measuring the signal strength at different APs, and then using these measurements to estimate the relative position of the client device.

In some embodiments, the process 900 may identify a direction of movement of the at least one client device based on the client device-to-AP ranging data (block 930). The direction of movement of the client device can be determined by analyzing the changes in the client device-to-AP ranging data over time. By way of a non-limiting example, if the distance between the client device and a particular AP is decreasing, it can be inferred that the client device is moving towards that AP, and vice versa.

In more embodiments, the process 900 may receive a confidence index associated with the at least one geo-position estimation from the client device (block 940). The confidence index can be calculated internally by the client device. By way of non-limiting examples, factors influencing the confidence index may include, but are not limited to, whether the client device is able to make GNSS measurements, the number of satellites the client device is able to identify, and the consistency of the geo-position measurements over time.

In additional embodiments, the process 900 may associate the at least one geo-position estimation with a confidence weight (block 950). In further embodiments, the confidence weight can be based in part on the position and movement of the client device. In particular, if the client device is situated at the periphery of the network and is moving towards the interior, a higher confidence weight may be assigned to the geo-position estimation reported by the client device. This is because such a movement pattern may suggest that the client device has recently transitioned from an outdoor environment to an indoor one. In outdoor environments, geo-positioning technologies such as GNSS are typically more accurate and reliable due to the unobstructed LOS to satellites. Therefore, the geo-position estimation derived shortly after the client device moves indoors is likely to be of higher quality, warranting a higher confidence weight. In still more embodiments, the confidence weight can be based in part on the confidence index reported by the client device. A higher confidence weight may be assigned based on a higher confidence index. Of course, in still further embodiments, the confidence weight can be based at least in part on both the position and movement of the client device and the confidence index reported by the client device.

In still additional embodiments, the process 900 may estimate a respective geo-position for each AP in the plurality of APs (block 960). The estimation can be based on the AP-to-AP ranging data, the client device-to-AP ranging data, and geo-position estimation of the at least one client device (including the confidence weight assigned to the geo-position estimation). The estimated geo-positions of the APs can then be used for various applications, such as, but not limited to, AFC.

Although a specific embodiment for estimating the geo-position of APs suitable for carrying out the various steps, processes, methods, and operations described herein is discussed with respect to FIG. 9, any of a variety of systems and/or processes may be utilized in accordance with embodiments of the disclosure. For example, the process can be implemented in a system where the APs are equipped with advanced signal processing capabilities that enable them to dynamically adjust their transmission power and coverage area based on the estimated AP geo-positions. The elements depicted in FIG. 9 may also be interchangeable with other elements of FIGS. 1-8 and 10 as required to realize a particularly desired embodiment.

Figure 10:
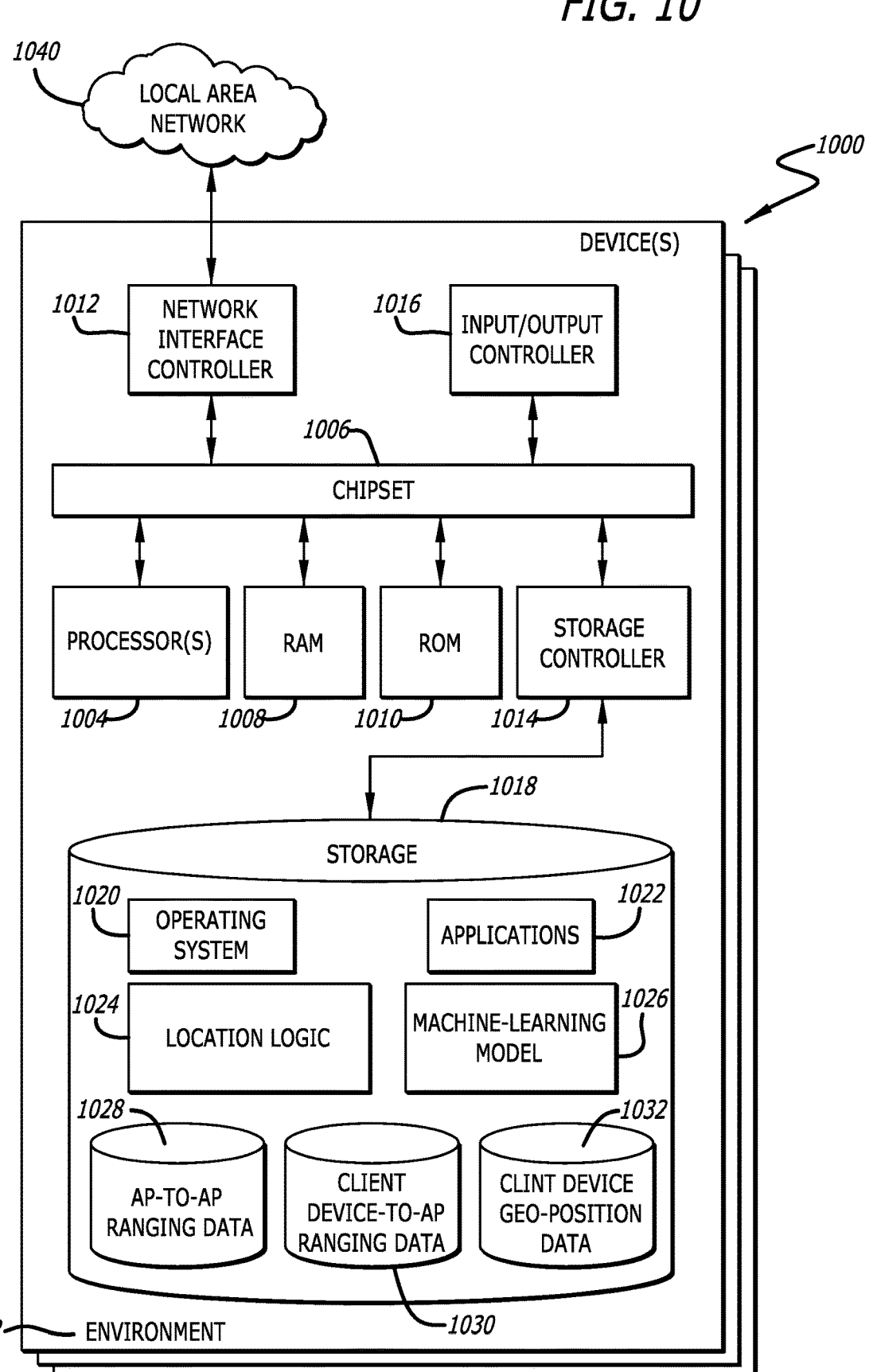
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, AP-to-AP ranging data 1028, client device-to-AP ranging data 1030, and client device geo-position data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a location logic 1024. The location logic 1024 may execute the processes related to estimating the geo-position of APs. The location logic 1024 can receive and process ranging data and client device geo-position, construct distance matrices, and apply various processes to estimate the geo-positions of APs.

In a number of embodiments, the storage 1018 can include AP-to-AP ranging data 1028. The AP-to-AP ranging data 1028 may relate to the distances between different APs in the network. The AP-to-AP ranging data 1028 can be obtained through various techniques such a, but not limited to, FTM or UWB.

In various embodiments, the storage 1018 can include client device-to-AP ranging data 1030. The client device-to-AP ranging data 1030 may relate to the distances between the client devices and the APs in the network. The client device-to-AP ranging data 1030 can be provided by the client devices via LMR feedback or other means.

In still more embodiments, the storage 1018 can include client device geo-position data 1032. The client device geo-position data 1032 can provide a reference point for the AP-to-AP graph. The client device geo-position data 1032 can be provided by the client device via an API or other means.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to analyze the AP-to-AP ranging data, the client device-to-AP ranging data, and the client device geo-position data, and use the data to predict the geo-positions of the APs with improved accuracy over time as it learns from the patterns and trends in the data.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising:
   a processor;
   at least one network interface controller configured to provide access to a network; and
   a memory communicatively coupled to the processor, wherein the memory comprises a location logic that is configured to:
      receive access point (AP)-to-AP ranging data associated with a plurality of APs;
      receive client device-to-AP ranging data associated with at least one client device and at least some APs in the plurality of APs;
      receive at least one geo-position estimation associated with the at least one client device;
      identify a location of the at least one client device relative to the plurality of APs based on the client device-to-AP ranging data;
      identify a direction of movement of the at least one client device based on the client device-to-AP ranging data;
      associate the at least one geo-position estimation with a confidence weight based on the identified location and the identified direction of movement of the at least one client device; and
      estimate a respective geo-position for each AP in the plurality of APs based on the AP-to-AP ranging data, the client device-to-AP ranging data, the at least one geo-position estimation, and the confidence weight.

2. The network node of claim 1, wherein the location logic is further configured to:
   identify one or more sets of APs in the plurality of APs, each set of APs in the one or more sets of APs being in a line-of-sight (LOS) condition; and
   construct a respective distance sub-matrix for each set of APs in the one or more sets of APs based on the AP-to-AP ranging data.

3. The network node of claim 2, wherein the location logic is further configured to:
   determine, for at least one set of APs in the one or more sets of APs, whether the at least one set of APs is located on a same plane based on the distance sub-matrix corresponding to the at least one set of APs.

4. The network node of claim 3, wherein whether the at least one set of APs is located on the same plane is determined based on multidimensional scaling (MDS).

5. The network node of claim 1, wherein the location logic is further configured to construct a distance matrix for the plurality of APs based on the AP-to-AP ranging data.

6. The network node of claim 5, wherein the location logic is further configured to identify one or more edge APs in the plurality of APs based on the distance matrix.

7. The network node of claim 1, wherein the client device-to-AP ranging data is provided by the at least one client device via location measurement report (LMR) feedback.

8. The network node of claim 1, wherein the at least one geo-position estimation is provided by the at least one client device via an application programming interface (API).

9. The network node of claim 1, wherein the location logic is further configured to determine whether the at least one client device and each AP in the at least some APs are in a line-of-sight (LOS) condition or a non-LOS (nLOS) condition based on the client device-to-AP ranging data.

10. The network node of claim 1, wherein the location logic is further configured to:
   estimate a first axis of a first horizontal plane associated with a pair of APs in the at least some APs based on the client device-to-AP ranging data, the first horizontal plane and the at least one client device being assumed to have a same first altitude;
   estimate a direction of a second axis of a second horizontal plane associated with the pair of APs based on the estimated first axis of the first horizontal plane, the second horizontal plane being parallel to the first horizontal plane, the second horizontal plane and the pair of APs being assumed to have a same second altitude; and
   improve an accuracy of a distance matrix for the plurality of APs based on the estimated direction of the second axis of the second horizontal plane and the client device-to-AP ranging data.

11. The network node of claim 1, wherein the location logic is further configured to:
   receive a confidence index associated with the at least one geo-position estimation; and
   associate the at least one geo-position estimation with a confidence weight based on the received confidence index.

12. The network node of claim 11, wherein the received confidence index is based at least in part on whether the at least one client device is able to compute its own global navigation satellite system (GNSS) position.

13. The network node of claim 1, wherein the respective geo-position for each AP in the plurality of APs is estimated beginning from an edge of the plurality of APs and then proceeding inward.

14. The network node of claim 1, wherein the AP-to-AP ranging data is based on fine timing measurement (FTM) or ultra-wideband (UWB).

15. The network node of claim 1, wherein the location logic is further configured to transmit an indication of the respective geo-position to each AP in the plurality of APs.

16. The network node of claim 1, wherein the network node corresponds to at least one of a controller, a location server, or an AP in the plurality of APs.

17. An access point (AP), comprising:
   a processor;
   at least one network interface controller configured to provide access to a network; and
   a memory communicatively coupled to the processor, wherein the memory comprises a location logic that is configured to:
      measure one or more distances to one or more other APs based on a ranging technique;
      receive an indication of a distance between at least one client device and the AP from the at least one client device;
      receive an indication of a geo-position of the at least one client device from the at least one client device;
      transmit an indication of the one or more distances to the one or more other APs, the indication of the distance between the at least one client device and the AP, and the indication of the geo-position of the at least one client device to a network node; and receive an indication of a geo-position of the AP from the network node, wherein the indication of the geo-position of the AP is estimated based on the indication of the geo-position of the at least one client device being associated with a confidence weight derived from an identified direction of movement of the at least one client device.

18. The AP of claim 17, wherein the indication of the distance between the at least one client device and the AP is received via location measurement report (LMR) feedback.

19. A method for estimating an access point (AP) geo-position, comprising:

receiving AP-to-AP ranging data associated with a plurality of APs;

receiving client device-to-AP ranging data associated with at least one client device and at least some APs in the plurality of APs;

receiving at least one geo-position estimation associated with the at least one client device;

identify a location of the at least one client device relative to the plurality of APs based on the client device-to-AP ranging data;

identify a direction of movement of the at least one client device based on the client device-to-AP ranging data;

associate the at least one geo-position estimation with a confidence weight based on the identified location and the identified direction of movement of the at least one client device; and estimating a respective geo-position for each AP in the plurality of APs based on the AP-to-AP ranging data, the client device-to-AP ranging data, the at least one geo-position estimation, and the confidence weight.

* * * * *